(12) United States Patent
Hoffmann et al.

(10) Patent No.: US 9,065,807 B2
(45) Date of Patent: Jun. 23, 2015

(54) AD-HOC RADIO COMMUNICATIONS SYSTEM

(75) Inventors: Ceilidh Hoffmann, Huntington Beach, CA (US); Bruce A. Dike, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 531 days.

(21) Appl. No.: 13/473,334

(22) Filed: May 16, 2012

(65) Prior Publication Data

US 2013/0308525 A1 Nov. 21, 2013

(51) Int. Cl.
*H04W 40/00* (2009.01)
*H04L 29/06* (2006.01)
*H04W 12/02* (2009.01)
*H04W 84/18* (2009.01)

(52) U.S. Cl.
CPC .......... *H04L 63/0471* (2013.01); *H04W 12/02* (2013.01); *H04W 84/18* (2013.01)

(58) Field of Classification Search
CPC ..... H04W 12/00; H04W 12/04; H04W 84/12; H04W 12/02; H04W 84/18; H04L 63/061; H04L 63/0428; H04L 63/00; H04L 63/04; H04L 63/0471
USPC .................. 370/338, 328, 323, 352; 709/206; 375/148; 713/182
See application file for complete search history.

(56) References Cited

U.S. PATENT DOCUMENTS

| 5,386,471 | A | 1/1995 | Bianco | |
|---|---|---|---|---|
| 2002/0178365 | A1* | 11/2002 | Yamaguchi | 713/182 |
| 2010/0296552 | A1* | 11/2010 | Budampati et al. | 375/148 |
| 2011/0243112 | A1* | 10/2011 | Misumi | 370/338 |
| 2013/0246549 | A1* | 9/2013 | Adams et al. | 709/206 |

FOREIGN PATENT DOCUMENTS

GB 2357019 A 6/2001

OTHER PUBLICATIONS

Combined Search and Examination Report dated Nov. 20, 2013, regarding Application No. GB1308512.1, 6 pages.
"Talk II—SINCGARS", Multiservice Communications Procedures for the Single-Channel Ground and Airborne Radio System, Air Land Sea Application Center, Marine Corps Publication No. 14400000700, May 1996, accessed Feb. 16, 2012, 77 pages, http://www.dtic.mil/doctrine/jel/service_pubs/sincgars.pdf.

(Continued)

*Primary Examiner* — Kwang B Yao
*Assistant Examiner* — Syed M Bokhari
(74) *Attorney, Agent, or Firm* — Yee & Associates, P.C.

(57) ABSTRACT

A wireless communications system comprising a wireless communications unit. The wireless communications unit comprises a communications device, a back-end router, a cryptographic module connected to the back-end router, and a front-end router connected to the cryptographic module and the communications device. The communications device is configured to exchange information over a single wireless communications channel. The front-end router is configured to perform at least one of sending a first data packet received at the front-end router from the communications device to the back-end router through the cryptographic module and sending a second data packet received at the front-end router from the back-end router through the cryptographic module to the communications device.

11 Claims, 7 Drawing Sheets

(56) References Cited

OTHER PUBLICATIONS

"Cisco 3230 Rugged Integrated Services Routers (ISR)", Data Sheet, Cisco Systems, Inc., 2008, accessed Feb. 16, 2012, 7 pages, http://www.cisco.com/en/US/prod/collateral/routers/ps272/product_data_sheet0900aecd800fe973.html.

"HNW: Highband Networking Waveform", Harris Defense Communications Systems, accessed Feb. 16, 2012, 2 pages, http://download.harris.com/app/public_download.asp?fid=2288.

"Joint Tactical Radio System (JTRS): Handheld, Manpack, Small Form Fit (HMS)", General Dynamics C4 Systems, accessed Feb. 16, 2012, 2 pages, http://www.gdc4s.com/content/detail.cfm?item=b8c971d4-9784-41c7-b8e1-1f557f1b2d0d.

"AN/PRC-117G Type-1 Wideband Tactical Radio", Harris RF Communications, accessed Feb. 16, 2012, 2 pages, http://rf.harris.com/capabilities/tactical-radios-networking/an-prc-117g/default.asp.

"ITT Exelis—SideHat", ITT Exelis, accessed Feb. 16, 2012, 2 pages, http://www.exelisinc.com/solutions/Pages/SideHat.aspx.

* cited by examiner

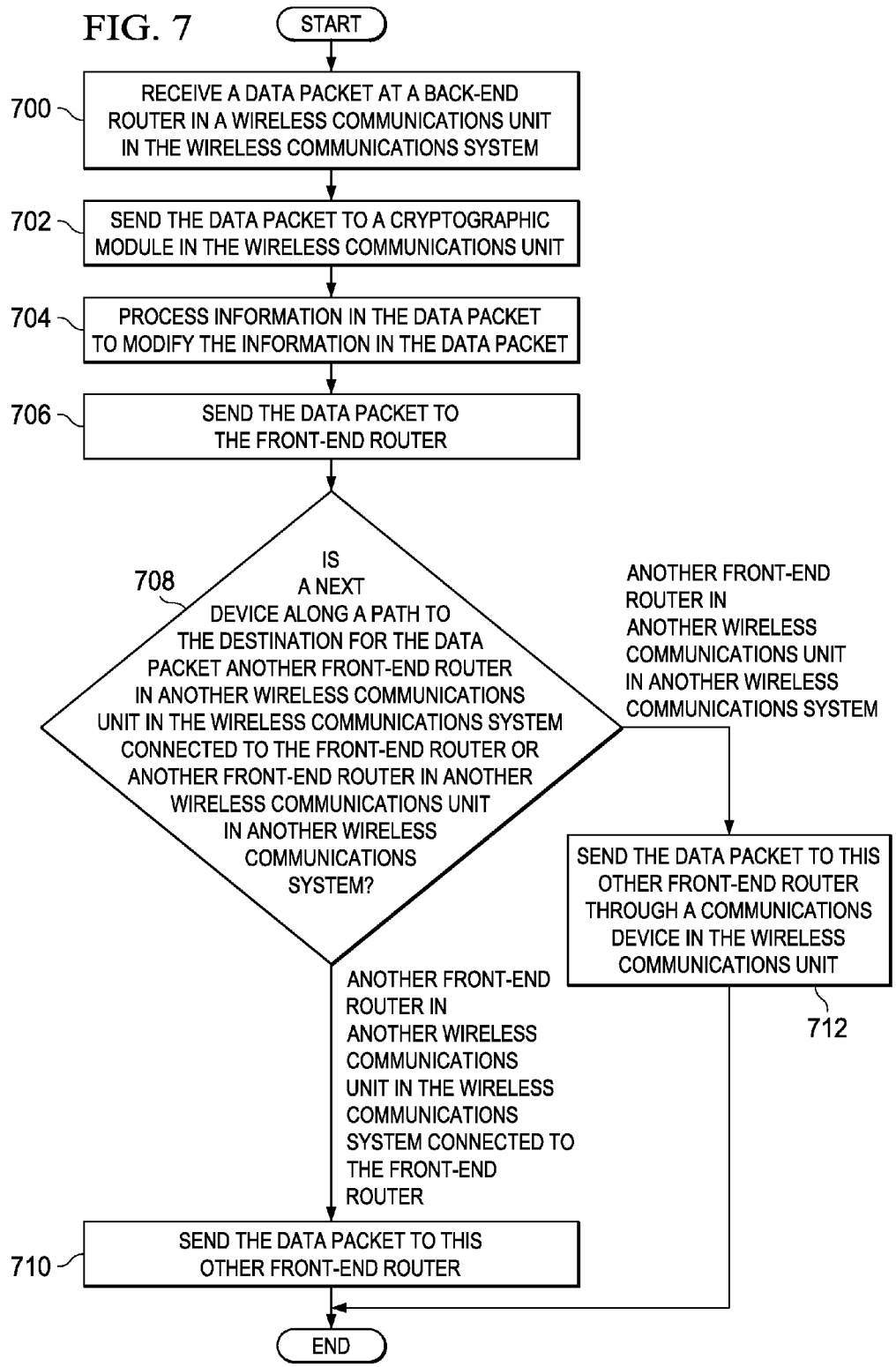

AD-HOC RADIO COMMUNICATIONS SYSTEM

BACKGROUND INFORMATION

1. Field

The present disclosure relates generally to a communications network and, in particular, to radio communications systems within the communications network. Still more particularly, the present disclosure relates to a method and apparatus for routing data packets based on different communications protocols to the correct destinations for these data packets using the radio communications systems within the communications network.

2. Background

A communications network allows information to be exchanged between different types of devices. As used herein, "exchanging" means sending, receiving, or a combination of the two. For example, information may be wirelessly sent from a source to a destination using a communications network. The source and the destination are devices connected to the communications network through one or more wireless communications systems in the communications network. The information may be wirelessly routed from the source to the destination through one or more wireless communications systems in the communications network.

A radio communications system is an example of one type of wireless communications system. A radio communications system is capable of sending and/or receiving information over a wireless communications channel using a radio frequency (RF) signal. The information may be carried in the radio frequency signal over the wireless communications channel in the form of one or more data packets.

A data packet is a segment of data that typically includes a header and a payload. The payload includes the information being carried in the data packet. The header includes other information such as, for example, a source of the payload, a destination for the payload, a size of the payload, a number of flag binary digits, an identifier for the data packet, and/or other useful information.

Different types of communications protocols are currently available for exchanging information across a communications network. As used herein, a "communications protocol" is a set of procedures to be followed when exchanging information across a communications network. In particular, the communications protocol selected for sending information from a source to a destination may determine the type of data packet formed to carry the information and the manner in which the data packet is routed through the particular communications network.

With some currently available configurations for radio communications systems, multiple wireless communications channels may be established with a radio communications system. Further, the radio communications system may be able to handle information based on multiple communications protocols. However, with these currently available configurations, each communications protocol is set to a different wireless communications channel. For example, the radio communications system may have a different circuitry for each type of communications protocol, with each circuitry required to send and receive information using a different wireless communications channel.

A radio communications system with this type of configuration may be more difficult than desired to reconfigure after assembly has been completed. For example, with this type of configuration, the different circuitries set to the different wireless communications channels may be more complex than desired. Adding a new circuitry or changing a circuitry to handle information based on a new communications protocol may be more difficult than desired. Therefore, it would be desirable to have a method and apparatus that takes into account at least some of the issues discussed above, as well as other possible issues.

SUMMARY

In one illustrative embodiment, a wireless communications system comprises a wireless communications unit. The wireless communications unit comprises a communications device, a back-end router, a cryptographic module connected to the back-end router, and a front-end router connected to the cryptographic module and the communications device. The communications device is configured to exchange information over a single wireless communications channel. The front-end router is configured to perform at least one of sending a first data packet received at the front-end router from the communications device to the back-end router through the cryptographic module and sending a second data packet received at the front-end router from the back-end router through the cryptographic module to the communications device.

In another illustrative embodiment, a communications network comprises a number of sub-networks. A sub-network in the number of sub-networks comprises a group of radio communications systems. A radio communications system in the group of radio communications systems comprises a number of radio communications units. A radio communications unit in the number of radio communications units comprises a communications device, a back-end router, a cryptographic module connected to the back-end router, and a front-end router connected to the cryptographic module and the communications device. The communications device is configured to exchange information over a single wireless communications channel using a radio frequency signal. The front-end router is configured to perform at least one of sending a first data packet received at the front-end router from the communications device to the back-end router through the cryptographic module and sending a second data packet received at the front-end router from the back-end router through the cryptographic module to the communications device.

In yet another illustrative embodiment, a method for exchanging information is present. A data packet is received at a front-end router in a wireless communications unit in a wireless communications system. A next device is identified by the front-end router along a path to a destination for the data packet using a header of the data packet. The data packet is sent from the front-end router to the next device along the path to the destination for the data packet. The next device is selected from one of a back-end router in the wireless communications unit, a communications device in the wireless communications unit, and another front-end router in another wireless communications unit in the wireless communications system. The front-end router and the back-end router are configured to exchange data packets through a cryptographic module.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a process for exchanging information, in the form of a flowchart, in accordance with an illustrative embodiment.

DETAILED DESCRIPTION

The different illustrative embodiments recognize and take into account that it may be desirable to have a radio communications system configured to send and receive information based on different types of communications protocols using a single wireless communications channel. Further, the different illustrative embodiments recognize that it may be desirable to have a wireless communications system with these capabilities that has a desired level of complexity. In particular, a wireless communications system that is simpler and more easily reconfigured as compared to some currently available configurations for radio communications systems may be desirable.

Thus, the different illustrative embodiments provide a wireless communications system configured to receive information over multiple wireless communications channels and route information based on different communications protocols. The wireless communications system provided by the different illustrative embodiments may have a desired level of simplicity and may be easily reconfigurable.

Figure 1:
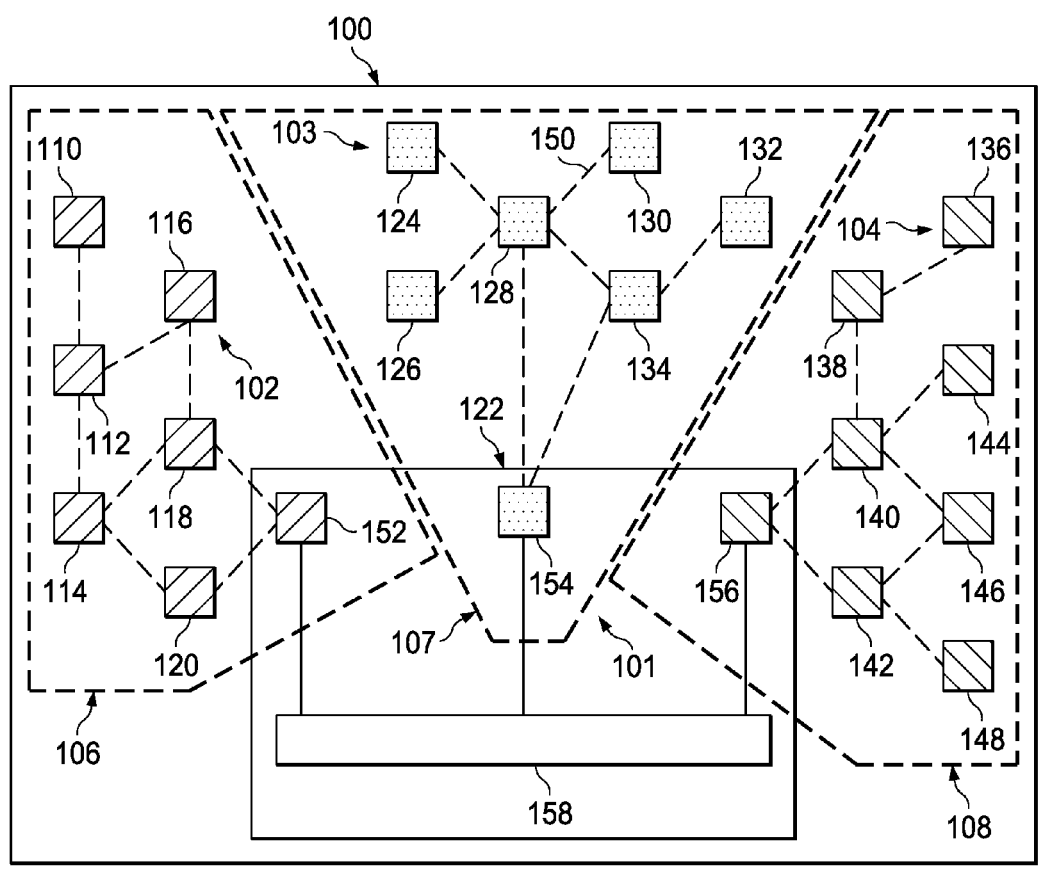
FIG. 1 is an illustration of a communications environment in accordance with an illustrative embodiment.

With reference now to FIG. 1, an illustration of a communications environment is depicted in accordance with an illustrative embodiment. In this illustrative example, communications environment 100 is an example of an environment in which different radio communications systems in communications network 101 may communicate with each other in accordance with an illustrative embodiment.

Communications network 101 includes group of radio communications systems 102, group of radio communications systems 103, and group of radio communications systems 104. As used herein, a "group of" items means one or more items. For example, group of radio communications systems 102 means one or more radio communications systems.

In this illustrative example, group of radio communications systems 102 includes radio communications systems 110, 112, 114, 116, 118, 120, and 122. These radio communications systems are part of sub-network 106 in communications network 101. Group of radio communications systems 103 includes radio communications systems 122, 124, 126, 128, 130, 132, and 134. These radio communications systems are part of sub-network 107 in communications network 101.

Group of radio communications systems 104 includes radio communications systems 122, 136, 138, 140, 142, 144, 146, and 148. These radio communications systems are part of sub-network 108 in communications network 101. In this manner, radio communications system 122 belongs to each of sub-networks 106, 107, and 108.

The different radio communications systems in communications network 101 communicate with each other using wireless communications channels 150. As used herein, a "wireless communications channel" is a wireless connection between two wireless communications systems. A wireless communications channel may also be referred to as a wireless communications link. Further, as used herein, a wireless communications channel may only be formed between two wireless communications systems at any given point in time.

In these illustrative examples, one radio communications system in communications network 101 may exchange information with another radio communications system in communications network 101 over a wireless communications channel using a radio frequency (RF) signal. This exchange of information may include, for example, sending information, receiving information, or a combination of the two. In some cases, the sending and receiving of information may be performed at the same time.

The configuration for radio communications system 122 is depicted in FIG. 1 as an example of one implementation for a radio communications system in communications network 101. As depicted, radio communications system 122 includes radio unit 152, radio unit 154, radio unit 156, and switch 158.

Radio unit 152 is configured to send information to and/or receive information from other radio communications systems in sub-network 106. Radio unit 154 is configured to send information to and/or receive information from other radio communications systems in sub-network 107. Further, radio unit 156 is configured to send information to and/or receive information from other radio communications systems in sub-network 108.

In this illustrative example, switch 158 is physically connected to radio units 152, 154, and 156. Switch 158 allows these radio units to exchange information with each other. For example, switch 158 may receive information from radio unit 152 and then send this information to radio unit 154. In this manner, switch 158 allows information to be exchanged across sub-networks 106, 107, and 108. In other words, radio communications system 122 interconnects sub-networks 106, 107, and 108.

The configuration for radio communications system 122 depicted in FIG. 1 may be the same as or different from the configurations for other radio communications systems in communications network 101. For example, some of these radio communications systems may have only one radio unit, while other wireless communications systems may have two, four, five, or some other suitable number of radio units.

In some cases, a radio communications system may not include a switch. Instead, the radio communications system may have two or more radio units that are physically connected to each other without using a switch or other type of device.

Figure 2:
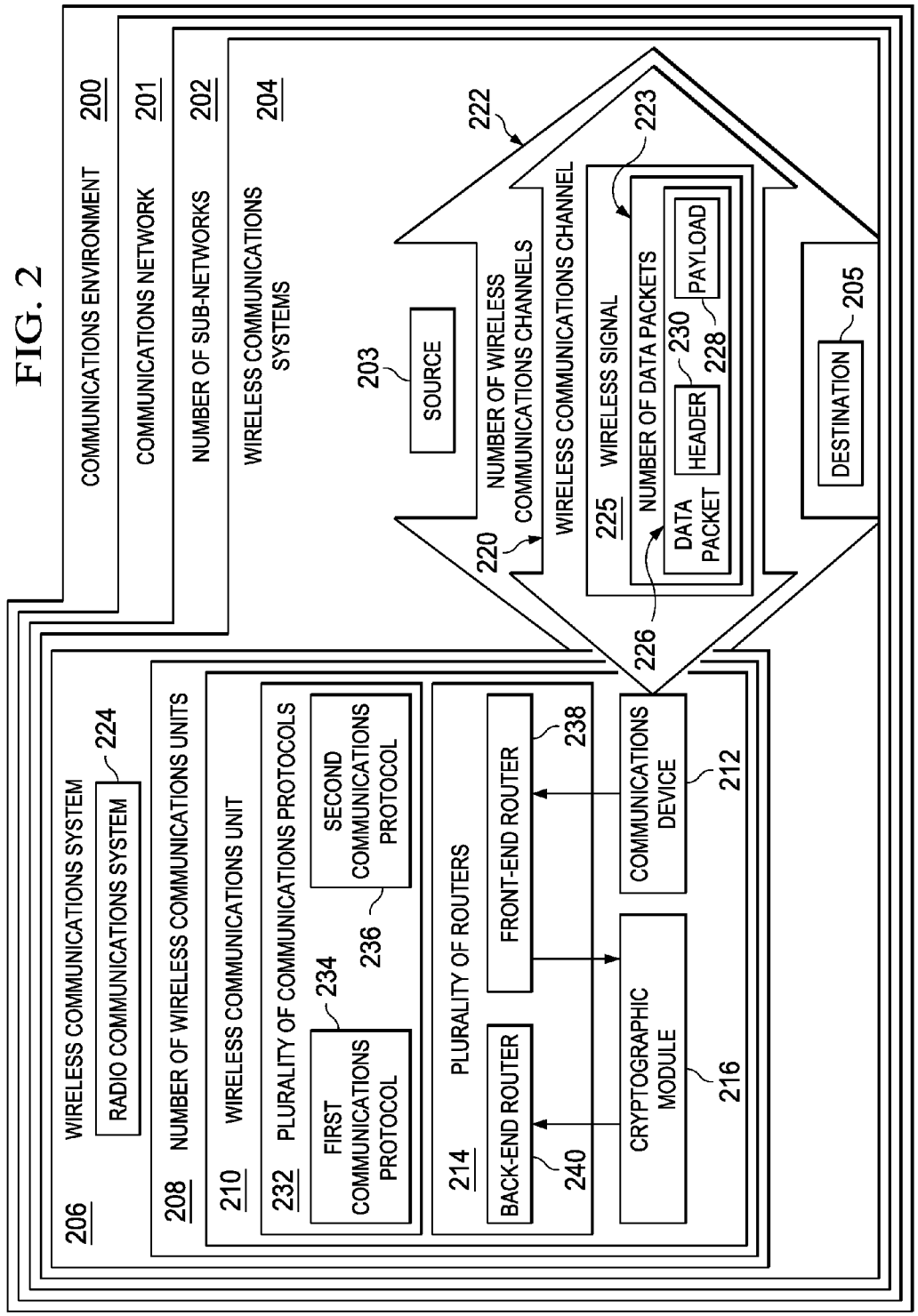
FIG. 2 is an illustration of a communications environment in the form of a block diagram in accordance with an illustrative embodiment.

With reference now to FIG. 2, an illustration of a communications environment in the form of a block diagram is depicted in accordance with an illustrative embodiment. Communications environment 100 in FIG. 1 is an example of one implementation for communications environment 200 in FIG. 2. Communications environment 200 includes communications network 201. Communications network 201 is a wireless communications network in these illustrative examples.

Communications network 201 includes number of sub-networks 202. As used herein, a "number of" items means one or more items. For example, number of sub-networks 202 means one or more sub-networks.

In these illustrative examples, a sub-network in number of sub-networks 202 may take various forms. For example, without limitation, a sub-network in number of sub-networks 202 may take the form of an airborne sub-network, a ground sub-network, the Internet, or some other suitable type of sub-network.

As depicted, number of sub-networks 202 includes wireless communications systems 204. The portion of wireless communications systems 204 belonging to a particular sub-network in number of sub-networks 202 may be referred to as a group of wireless communications systems. Group of radio communications systems 102 belonging to sub-network 106 in FIG. 1 is an example of one implementation for a group of wireless communications systems belonging to a particular sub-network in number of sub-networks 202.

Source 203 may send information to destination 205 using one or more of wireless communications systems 204 in communications network 201. Source 203 is connected to one of wireless communications systems 204. Further, destination 205 is connected to one of wireless communications systems 204. Each of these connections may be a wired connection, a wireless connection, or some other suitable type of connection.

In these illustrative examples, wireless communications system 206 is an example of one of wireless communications systems 204. Wireless communications system 206 comprises number of wireless communications units 208. Wireless communications unit 210 is an example of a wireless communications unit in number of wireless communications units 208.

As depicted, wireless communications unit 210 includes communications device 212, plurality of routers 214, and cryptographic module 216. Communications device 212 is configured to form wireless communications channel 220 with a communications device in a wireless communications unit in another wireless communications system in wireless communications systems 204. Further, communications device 212 is configured to exchange information over wireless communications channel 220. This information may include, for example, at least one of a message, voice data, audio data, an image, a video, a file, a document, a command, and other suitable types of data.

Communications device 212 may comprise, for example, without limitation, at least one of an antenna, a directional antenna, an omnidirectional antenna, a transmitter, a receiver, a transceiver, a processor unit, a multiplier, an analog to digital converter (ADC), a digital to analog converter (DAC), a modem, and other suitable types of components. As used herein, the phrase "at least one of", when used with a list of items, means different combinations of one or more of the listed items may be used and only one of each item in the list may be needed.

For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; or some other suitable combination.

In these illustrative examples, each wireless communications unit in number of wireless communications units 208 in wireless communications system 206 may have a communications device configured to form a wireless communications channel. In this manner, wireless communications channel 220 may be one of number of wireless communications channels 222 that may be formed by number of wireless communications units 208 in wireless communications system 206.

As depicted, communications device 212 is configured to exchange information over wireless communications channel 220 using wireless signal 225. Wireless signal 225 may be selected from one of, for example, without limitation, a radio frequency (RF) signal, an optical signal, an infrared signal, an electromagnetic signal, an audio signal, or some other suitable type of wireless signal, depending on the implementation.

When wireless signal 225 is a radio frequency signal, wireless communications unit 210 may be referred to as a radio unit or a radio. Number of wireless communications units 208 may be a number of radio units. When at least one of the wireless communications units in number of wireless communications units 208 in wireless communications system 206 is a radio unit, wireless communications system 206 may be referred to as radio communications system 224. In this manner, a sub-network in number of sub-networks 202 may be formed using a group of radio communications systems.

In these illustrative examples, information may be carried in wireless signal 225 over wireless communications channel 220 in the form of number of data packets 223. As used herein, a "data packet", such as a data packet in number of data packets 223, is a segment of data comprising one or more pieces of information that is being sent from or received at a communications system over a communications channel.

Data packet 226 is an example of one of number of data packets 223. Data packet 226 may be, for example, a data packet that is being routed from source 203 to destination 205 across communications network 201. Wireless communications system 206 may be one point along a path from source 203 to destination 205 through communications network 201. This path may also be referred to as a route.

In one illustrative example, data packet 226 comprises payload 228 and header 230. Payload 228 includes the information being carried in data packet 226. Header 230 includes additional information such as, for example, at least one of source 203 of payload 228, destination 205 for payload 228, a size of payload 228, a number of flag binary digits, an identifier for data packet 226, and other useful information. In some cases, data packet 226 may be referred to as a datagram, a data segment, a data block, a data cell, or a data frame, depending on the implementation.

Further, in these illustrative examples, data packet 226 is formed and routed through communications network 201 based on one of plurality of communications protocols 232. As used herein, a "communications protocol", such as one of plurality of communications protocols 232, is a set of procedures to be followed when exchanging information in communications network 201. For example, a communications protocol may include procedures for at least one of signaling, authentication, error detection, error correction, and other suitable types of functions. In some cases, a communications protocol may define the syntax, semantics, and/or synchronization with which a data packet is formed and routed through communications network 201.

In one illustrative example, plurality of communications protocols 232 includes first communications protocol 234 and second communications protocol 236. First communications protocol 234 may be, for example, without limitation, a security protocol for handling information belonging to a first security category. Second communications protocol 236 may be, for example, without limitation, a security protocol for handling information belonging to a second security category.

As used herein, a "security category" is a category for information requiring a particular level of security or protection. For example, the first security category may correspond to a level of security that is lower than the level of security corresponding to the second security category. In other words, access to information belonging to the second security category may require a higher level of clearance or authorization than access to information belonging to the first security category.

As one illustrative example, when the information carried in payload 228 belongs to the first security category, data packet 226 is formed based on first communications protocol 234. In this example, both the information carried in payload 228 and the additional information in header 230 are left unencrypted. This type of data packet 226 may be referred to as an unencrypted data packet.

In another illustrative example, when the information carried in payload 228 belongs to the second security category, data packet 226 is formed based on second communications protocol 236. In this example, the information carried in payload 228 is encrypted. However, the additional information in header 230 is left unencrypted. This type of data packet 226 may be referred to as an encrypted data packet. In this manner, the additional information in header 230 may always be left unencrypted regardless of whether the information carried in payload 228 belongs to the first security category or the second security category.

As depicted, plurality or routers 214 includes front-end router 238 and back-end router 240. A "router", as used herein, such as front-end router 238 and back-end router 240, is a hardware device configured to forward a data packet to a next device along a path to a destination for the data packet.

Further, a router may be connected to one or more hosts. A "host", as used herein, is a device configured to connect to a sub-network in number of sub-networks 202 in communications network 201 through a router. A host may take various forms. For example, a host may take the form of a computer, a notebook computer, a tablet computer, a mobile phone, a data processing system, a printer, a scanner, a fax machine, an analog radio communications unit, a digital radio, a microphone, a speaker, a display system, a head-mounted display system, or some other suitable type of device. In some cases, a host may be referred to as a client system or a server system.

A host may be connected to a router using a physical connection such as, for example, a wire, a cable, or some other suitable physical medium. Typically, a host is connected to a router at a communications port for the router using a cable. Of course, in other illustrative examples, a host may be connected to a router using a wireless communications channel, an optical communication channel, or some other suitable type of communication channel or link.

Each of front-end router 238 and back-end router 240 may be connected to one or more hosts. Any of these hosts may be source 203 of data packet 226 or destination 205 for data packet 226. A host connected to front-end router 238 is authorized to have access to information belonging to a first security category. A host connected to back-end router 240 is authorized to have access to information belonging to a second security category. In some cases, a host connected to back-end router 240 may be authorized to have access to information belonging to both the first security category and the second security category.

Additionally, front-end router 238 is connected to communications device 212 and cryptographic module 216. Back-end router 240 is connected to cryptographic module 216. These connections with front-end router 238 and back-end router 240 may be physical connections. Front-end router 238 and back-end router 240 may exchange data packets with each other through cryptographic module 216.

In these illustrative examples, any data packets received at wireless communications unit 210 and/or sent from wireless communications unit 210 must pass through front-end router 238. As one illustrative example, when communications device 212 receives a first data packet over wireless communications channel 220, communications device 212 sends the first data packet to front-end router 238. In this illustrative example, the first data packet may be data packet 226.

Front-end router 238 uses header 230 of data packet 226 to identify a next device along the path to destination 205 for data packet 226. The next device may be, for example, back-end router 240, a host connected to front-end router 238, another front-end router in another wireless communications unit in number of wireless communications units 208 in wireless communications system 206, or another front-end router in another wireless communications unit in another wireless communications system in wireless communications systems 204.

Data packet 226 is to be forwarded to back-end router 240 when data packet 226 is an encrypted data packet. When data packet 226 is to be forwarded to back-end router 240, front-end router 238 sends data packet 226 to back-end router 240 through cryptographic module 216. In particular, front-end router 238 sends data packet 226 to cryptographic module 216.

Cryptographic module 216 processes the information carried in payload 228 of data packet 226 to modify the information in payload 228. For example, when the information carried in payload 228 of data packet 226 is encrypted, cryptographic module 216 decrypts this information such that data packet 226 becomes an unencrypted data packet.

Cryptographic module 216 then sends the unencrypted data packet to back-end router 240. In response to receiving data packet 226, back-end router 240 uses header 230 to identify a next device along the path to destination 205 for data packet 226. This next device may be, for example, a host connected to back-end router 240.

In another illustrative example, when communications device 212 sends a second data packet from wireless communications unit 210, this second data packet is always received at communications device 212 from front-end router 238. This second data packet may be data packet 226 in this example. For example, front-end router 238 may receive data packet 226 from one of a host connected to front-end router 238, another front-end router in another wireless communications unit in number of wireless communications units 208 in wireless communications system 206, or back-end router 240.

Front-end router 238 may receive data packet 226 from back-end router 240 through cryptographic module 216. For example, a host connected to back-end router 240 may send data packet 226 to back-end router 240. Back-end router 240 uses header 230 to determine that data packet 226 is to be forwarded to front-end router 238. In particular, back-end router 240 sends data packet 226 to front-end router 238 through cryptographic module 216.

In response to receiving data packet 226 from back-end router 240, cryptographic module 216 processes the information carried in payload 228 of data packet 226 to modify this information. For example, when the information carried in payload 228 of data packet 226 is unencrypted, cryptographic module 216 encrypts this information such that data packet 226 becomes an encrypted data packet.

Cryptographic module 216 then sends this encrypted data packet to front-end router 238. Front-end router 238 may then route data packet 226 to the next device along the path to destination 205 for data packet 226 through communications device 212.

In these illustrative examples, cryptographic module 216 may comprise hardware, software, or a combination of the two. For example, cryptographic module 216 may be implemented in a processor unit within wireless communications unit 210. When hardware is employed, the hardware may include circuits that perform the operations for cryptographic module 216.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

Additionally, cryptographic module 216 may perform other functions in addition to or in place of encrypting and decrypting information. For example, without limitation, cryptographic module 216 may also be configured to perform at least one of digital key exchange, digital key management, message authentication, and/or other suitable functions. Cryptographic module 216 may be configured to perform any function that manages a level of security for information.

In these illustrative examples, all information that is to be sent from a host connected to back-end router 240 in wireless communications system 206 to another wireless communications system must first be sent to cryptographic module 216 and encrypted. Cryptographic module 216 then sends the encrypted information to front-end router 238. Further, all information received at front-end router 238 from communications device 212 that is to be sent to a host connected to back-end router 240 must first pass through cryptographic module 216 for decryption.

With front-end router 238 configured to send information to and receive information from back-end router 240 using cryptographic module 216, back-end router 240 may not need to be connected to a separate communications device that has established a separate communication channel. Hosts connected to both front-end router 238 and back-end router 240 may send information from and receive information at wireless communications unit 210 through the single wireless communications channel 220 formed by communications device 212.

Figure 3:
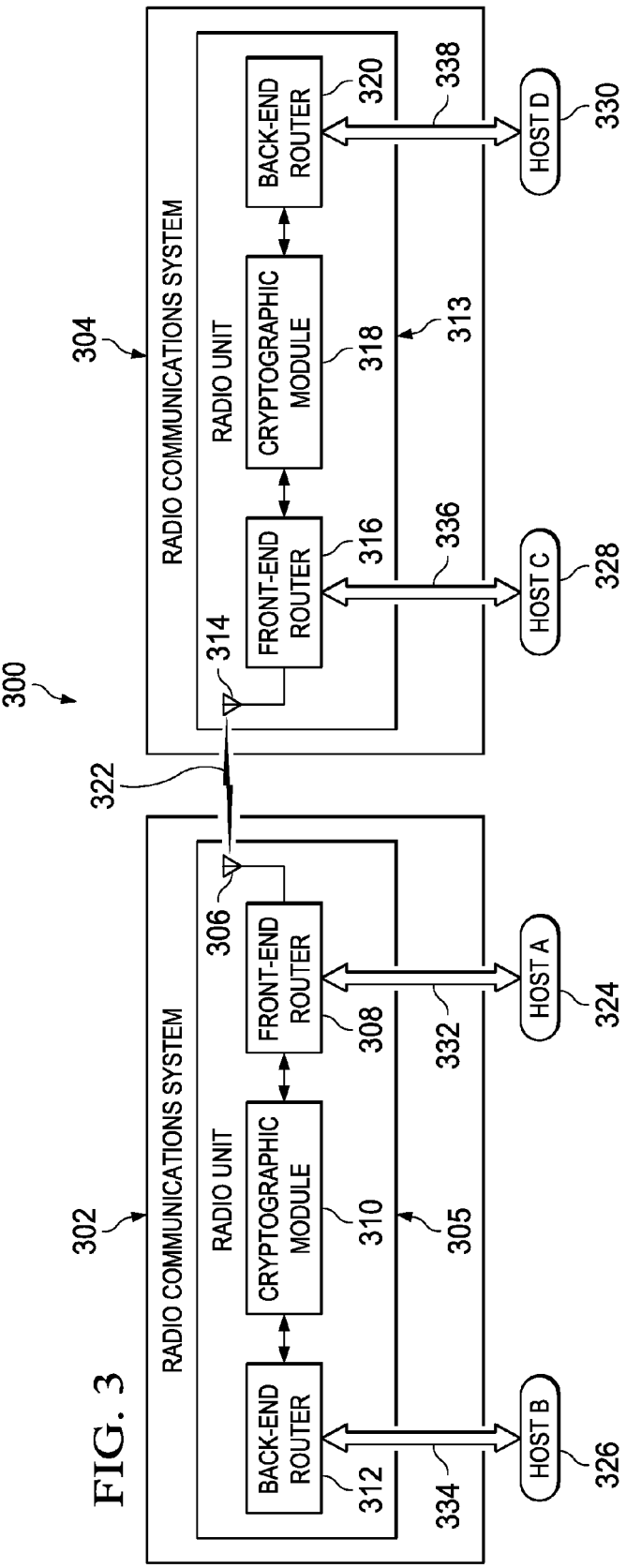
FIG. 3 is an illustration of a communications network in accordance with an illustrative embodiment.
Figure 4:
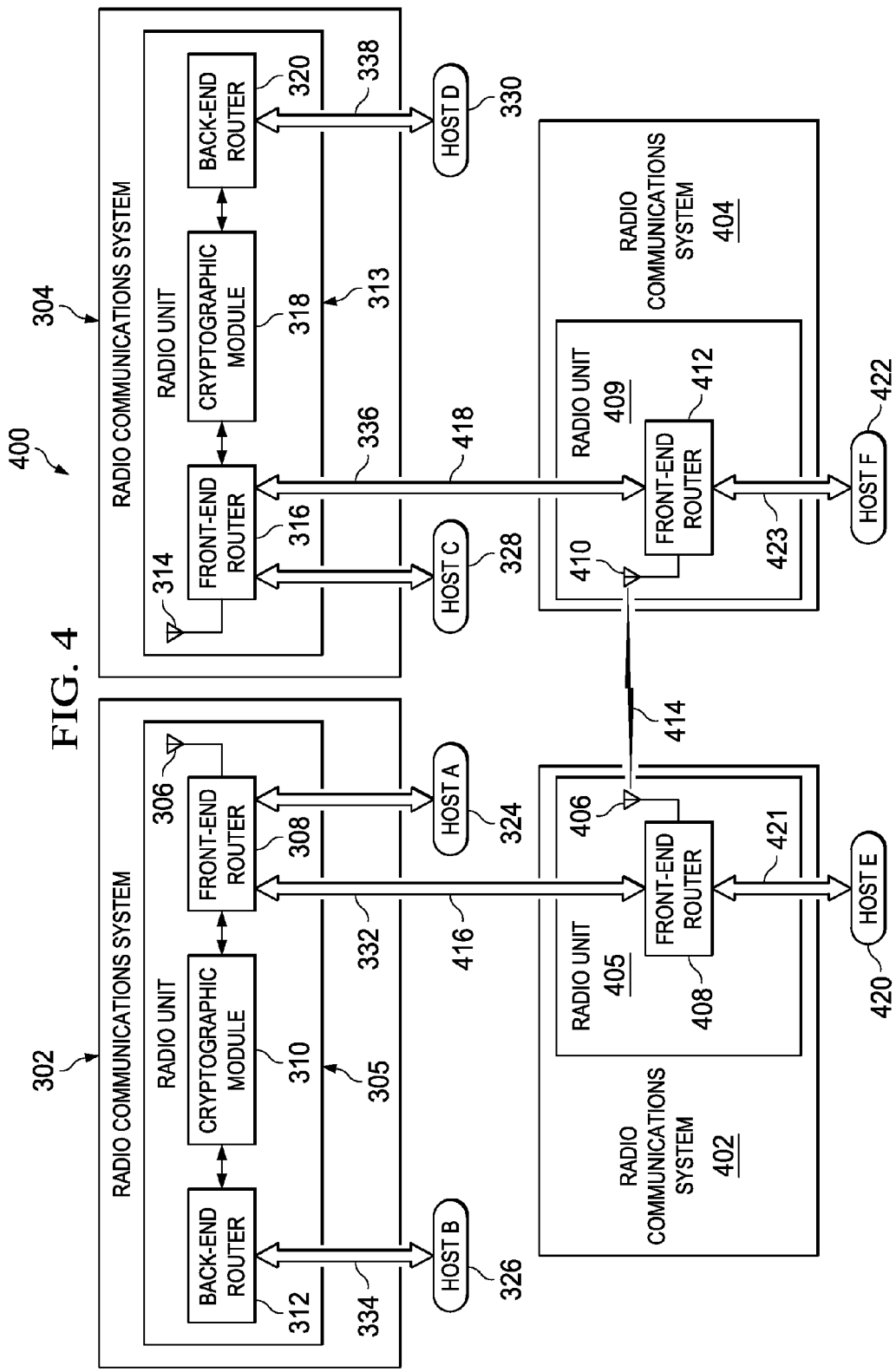
FIG. 4 is an illustration of a communications network in accordance with an illustrative embodiment.
Figure 5:
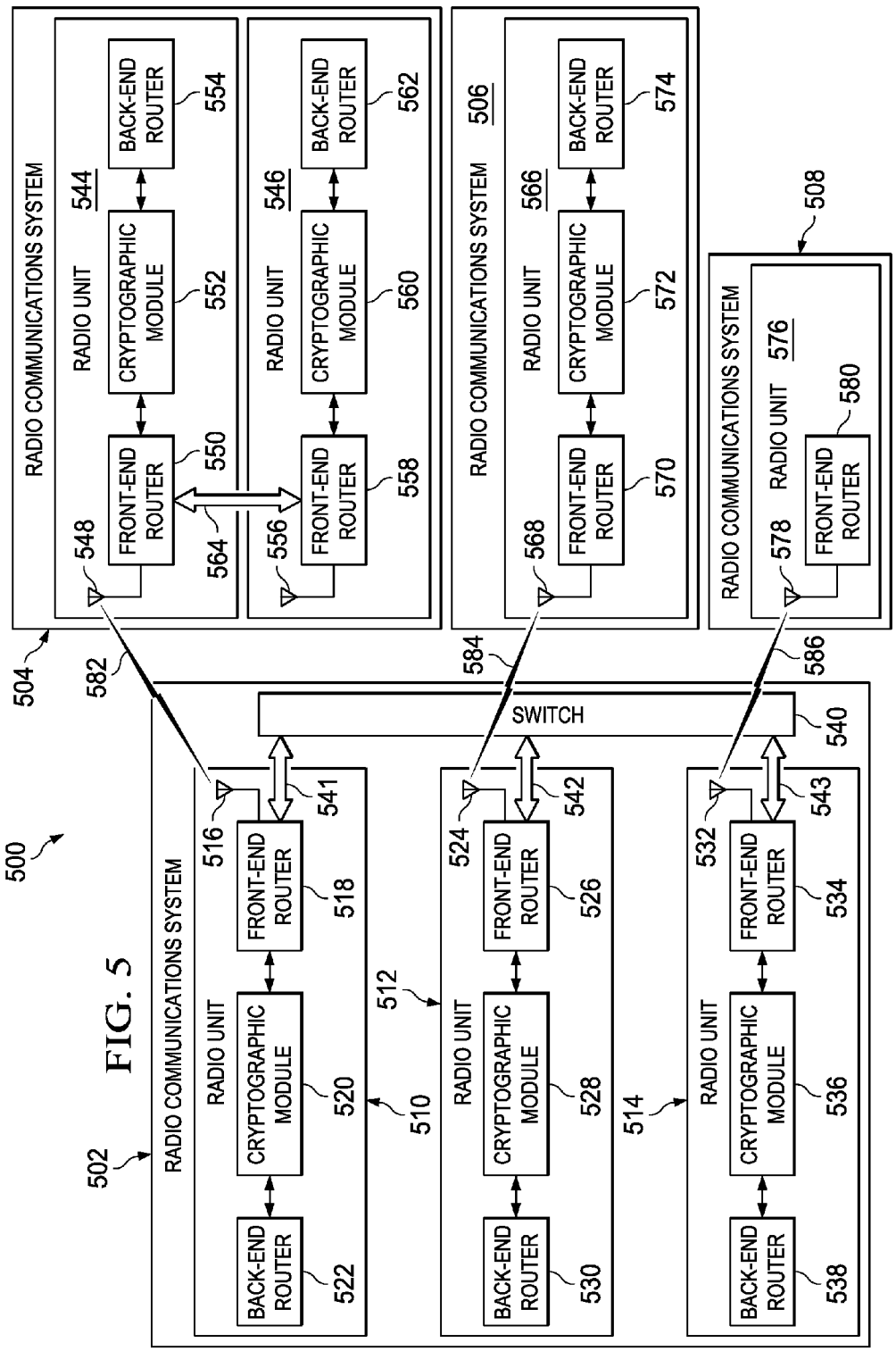
FIG. 5 is an illustration of a communications network in accordance with an illustrative embodiment.

In this manner, any number of different scenarios may be present for handling the sending and/or receiving of information by wireless communications unit 210 in wireless communications system 206. Examples of the different types of scenarios for the exchange of information between different wireless communications systems are described in greater detail in FIGS. 3-5. Further, different types of configurations for a wireless communications system are depicted in FIGS. 3-5.

Further, wireless communications system 206 may be reconfigurable. For example, one or more of number of wireless communications units 208 may be removed and/or replaced, while wireless communications system 206 is in use, based on the needs of the system or user using wireless communications system 206. Further, one or more additional wireless communications units may be added to wireless communications system 206. In this manner, wireless communications system 206 may be referred to as an ad-hoc wireless communications system. When wireless communications system 206 is a radio communications system, the radio communications system may be referred to as an ad-hoc radio communications system.

In these illustrative examples, wireless communications systems 204 may be associated with a platform. When one component is "associated" with another component, the association is a physical association in these depicted examples. For example, a first component, such as wireless communications system 204, may be considered to be associated with a second component, such as a platform, by being secured to the second component, bonded to the second component, mounted to the second component, welded to the second component, fastened to the second component, and/or connected to the second component in some other suitable manner.

The first component also may be connected to the second component using a third component. The first component may also be considered to be associated with the second component by being formed as part of and/or an extension of the second component.

Wireless communications system 204 may be associated with a platform. This platform may take various forms. For example, without limitation, the platform may be selected from one of an aerospace vehicle, an unmanned aerial vehicle (UAV), an aircraft, a spacecraft, a ground vehicle, an unmanned ground vehicle (UGV), a ship, a submarine, a building, a manmade structure, a satellite, a tower, a physical enclosure, a manpack, a handheld platform, or some other suitable type of platform. In this manner, the platform may be mobile, stationary, portable, or some combination of these three.

In some cases, the platform may be configured to provide power and other capabilities and/or features to wireless communications system 206. For example, the platform may provide protection from an environment external to wireless communications system 206.

The illustration of communications environment 200 in FIG. 2 is not meant to imply physical or architectural limitations to the manner in which an illustrative embodiment may be implemented. Other components in addition to or in place of the ones illustrated may be used. Some components may be optional. Additionally, the blocks in FIG. 2 are presented to illustrate some functional components. One or more of these blocks may be combined, divided, or combined and divided into different blocks when implemented in an illustrative embodiment.

In some illustrative examples, plurality of routers 214 may include one or more routers in addition to front-end router 238 and back-end router 240. In other illustrative examples, plurality of routers 214 may be configured to handle information based on one or more communications protocols in addition to first communications protocol 234 and second communications protocol 236.

In some cases, two wireless communications units in number of wireless communications units 208 in wireless communications system 206 may each have a front-end router. These front-end routers may be connected to each other using a wired connection or some other suitable type of medium. In one illustrative example, a wire or cable may be used to connect a communications port for a particular front-end router to the communications port for another front-end router.

In yet another illustrative example, a wireless communications unit in number of wireless communications units 208 may have only a front-end router and may not have a back-end router or a cryptographic module. This front-end router may be connected to front-end router 238.

In some cases, a data packet, such as data packet 226 may be managed based on more than one communications protocol. For example, data packet 226 may be received and handled at front-end router 238 based on one communications protocol. However, cryptographic module 216 may handle data packet 226 according to a different communications protocol. This communications protocol may be, for example, an encryption protocol.

With reference now to FIG. 3, an illustration of a communications network is depicted in accordance with an illustrative embodiment. Communications network 300 in FIG. 3 is an example of one implementation for communications network 201 in FIG. 2. Communications network 300 includes radio communications system 302 and radio communications system 304. These radio communications systems are examples of implementations for radio communications system 224 in FIG. 2.

In this illustrative example, radio communications system 302 includes radio unit 305. Radio unit 305 includes communications device 306, front-end router 308, cryptographic module 310, and back-end router 312. Radio communications system 304 includes radio unit 313. Radio unit 313 includes communications device 314, front-end router 316, cryptographic module 318, and back-end router 320.

As depicted, wireless communications channel 322 is established between communications device 306 and communications device 314. Information may be exchanged between radio communications system 302 and radio communications system 304 using wireless communications channel 322.

In this illustrative example, host A 324 is connected to front-end router 308 in radio unit 305 through physical connection 332. Host B 326 is connected to back-end router 312 in radio unit 305 through physical connection 334. Further, host C 328 is connected to front-end router 316 in radio unit 313 through physical connection 336. Host D 330 is connected to back-end router 320 in radio unit 313 through physical connection 338.

Host A 324, host B 326, host C 328, and host D 330 may communicate with each other using radio communications system 302 and radio communications system 304. For example, host A 324 may need to send a data packet to host C 328. In other words, host A 324 may be the source of the data packet and host C 328 may be the destination for the data packet.

Host A 324 first sends the data packet to front-end router 308 in radio unit 305. Front-end router 308 uses the header of the data packet to determine that host C 328 is the destination for the data packet. Further, front-end router 308 uses the header of the data packet and in some cases, a routing table, to determine that the next device along the path to the destination for the data packet is front-end router 316 in radio unit 313.

Front-end router 308 sends the data packet to front-end router 316 through communications device 306. In particular, communications device 306 sends the data packet to communications device 314 over wireless communications channel 322. Communications device 314 sends the data packet to front-end router 316. Front-end router 316 uses the header of the data packet to determine that the destination for the data packet is host C 328. Front-end router 316 then sends the data packet to host C 328.

In another illustrative example, host B 326 may need to send a data packet to host D 330 with a desired level of security. Host B 326 may be a source of the data packet and host D 330 may be a destination for the data packet. Host B 326 may need to send a data packet to host D 330 in which the information carried in the payload of the data packet is encrypted when the data packet is sent over wireless communications channel 322.

In this example, host B 326 sends an unencrypted data packet to back-end router 312. Back-end router 312 then sends the unencrypted data packet to cryptographic module 310. Cryptographic module 310 encrypts the information carried in the payload of the data packet to form an encrypted data packet. Cryptographic module 310 then sends this encrypted data packet to front-end router 308. Front-end router 308 uses the header of the encrypted data packet to determine that the next device along the path to the destination for the encrypted packet is front-end router 316 in radio unit 313.

Front-end router 308 sends the encrypted data to front-end router 316 through communications device 306. In particular, communications device 306 sends the encrypted data packet to communications device 314 over wireless communications channel 322. In response to receiving the encrypted data packet, communications device 314 sends the encrypted data packet to front-end router 316. Front-end router 316 uses the header of the encrypted data packet to determine that the next device along the path to the destination for the encrypted data packet is back-end router 320.

Consequently, front-end router 316 sends the encrypted data packet to cryptographic module 318. Cryptographic module 318 decrypts the information carried in the payload of the encrypted data packet to recover the original unencrypted data packet formed by host B 326. Cryptographic module 318 then sends this unencrypted data packet to back-end router 320. Back-end router 320 uses the header of the unencrypted data packet to determine that host D 330 is the destination for the data packet. Back-end router 320 then forwards the unencrypted data packet to host D 330.

With reference now to FIG. 4, an illustration of a communications environment is depicted in accordance with an illustrative embodiment. In this illustrative example, radio communications system 402 and wireless communications system 404 have been added to communications network 300 from FIG. 3.

As depicted, radio communications system 402 includes radio unit 405. Radio unit 405 includes communications device 406 and front-end router 408. Radio communications system 402 includes radio unit 409. Radio unit 409 includes communications device 410 and front-end router 412. Wireless communications channel 414 has been established between communications device 406 and communications device 410.

As depicted, front-end router 308 and front-end router 408 are connected through physical connection 416. Further, front-end router 316 and front-end router 412 are connected through physical connection 418. Additionally, host E 420 is connected to front-end router 408 through physical connection 421 and host F 422 is connected to back-end router 412 through physical connection 423.

In this illustrative example, wireless communications channel 322 from FIG. 3 has not been established between communications device 306 and communications device 314. Instead, radio unit 305 and radio unit 313 may communicate with each other using radio unit 405 and radio unit 409.

In one illustrative example, host A 324 may send a data packet to front-end router 308 in radio unit 305 over physical connection 332. Front-end router 308 uses the header of the data packet to identify the next device along the path to the destination for the data packet. When the next device along this path is front-end router 408 in radio unit 405, front-end router 308 sends the data packet directly to front-end router 408 using physical connection 416.

Front-end router 408 then uses the header of the data packet to identify the next device along the path to the destination for the data packet. In some cases, the next device along the path may be the destination for the path. This destination may be host E 420. Front-end router 408 may then send the data packet to host E 420 using physical connection 421.

However, in other cases, the next device along the path may be front-end router 412 in radio unit 409. In these cases, front-end router 408 sends the data packet to communications device 406, which in turn, sends the data packet to communications device 410 over wireless communications channel 414. Communications device 410 sends the data packet to front-end router 412.

Front-end router 412 uses the header of the data packet to identify the next device along the path to the destination for the data packet. If the next device along the path is host F 422, front-end router 412 sends the data packet to host F 422 using physical connection 423. In some cases, the next device may be front-end router 316 in radio communications system 302. In these cases, front-end router 412 sends the data packet directly to front-end router 316 using physical connection 418. Front-end router 316 may determine that host C 328 is the destination for the data packet using the header of the data packet. Front-end router 316 sends the data packet to host C 328 using physical connection 336.

In another illustrative example, host B 326 may send a data packet to host D 330 using radio units 305, 405, 409, and 313. For example, host B 326 may send the data packet to back-end router 312 over physical connection 334. Back-end router 312 sends the data packet to cryptographic module 310. Cryptographic module 310 encrypts the information carried in the payload of the data packet and then sends the encrypted data packet to front-end router 308.

The encrypted data packet is then sent from front-end router 308 to front-end router 408 over physical connection 416, from front-end router 408 to communications device 406, from communications device 406 to communications device 410 over wireless communications channel 414, from communications device 410 to front-end router 412, from front-end router 412 to front-end router 316 over physical connection 418, and from front-end router 316 to cryptographic module 318.

Cryptographic module 318 decrypts the information carried in the payload of the encrypted data packet to recover the initial data packet generated by host B 326. Cryptographic module 318 sends this unencrypted data packet to back-end router 320. Back-end router 320 forwards the unencrypted data packet to host D 330.

The hosts illustrated as having connections to the different radio units in FIGS. 3-4 may take a number of different forms. These hosts may take the form of, for example, without limitation, laptop computers, tablet computers, computers integrated into vehicles, mobile phones, speakers, headphones, servers, and/or other suitable types of hosts.

With reference now to FIG. 5, an illustration of a communications network is depicted in accordance with an illustrative embodiment. Communications network 500 in FIG. 5 is an example of one implementation for communications network 201 in FIG. 2. As depicted, communications network 500 includes radio communications system 502, radio communications system 504, radio communications system 506, and radio communications system 508.

Radio communications system 502 includes radio unit 510, radio unit 512, and radio unit 514. Radio unit 510 includes communications device 516, front-end router 518, cryptographic module 520, and back-end router 522. Radio unit 512 includes communications device 524, front-end router 526, cryptographic module 528, and back-end router 530. Radio unit 514 includes communications device 532, front-end router 534, cryptographic module 536, and back-end router 538.

Additionally, radio communications system 502 includes switch 540. Switch 540 connects radio unit 510, radio unit 512, and radio unit 514 to each other. In particular, front-end router 518 is connected to switch 540 by physical connection 541. Front-end router 526 is connected to switch 540 by physical connection 542. Front-end router 534 is connected to switch 540 by physical connection 543. Information may be exchanged between radio unit 510, radio unit 512, and radio unit 514 using switch 540.

Further, radio communications system 504 includes radio unit 544 and radio unit 546. Radio unit 544 includes communications device 548, front-end router 550, cryptographic module 552, and back-end router 554. Radio unit 546 includes communications device 556, front-end router 558, cryptographic module 560, and back-end router 562. Front-end router 558 and front-end router 550 are connected through physical connection 564.

Radio communications system 506 includes radio unit 566. Radio unit 566 includes communications device 568, front-end router 570, cryptographic module 572, and back-end router 574. Radio communications system 508 includes radio unit 576. Radio unit 576 includes communications device 578 and front-end router 580.

In this illustrative example, wireless communications channel 582 has been established between communications device 516 and communications device 548. Wireless communications channel 584 has been established between communications device 524 and communications device 568. Wireless communications channel 586 has been established between communications device 532 and communications device 578.

Data packets may be exchanged between radio communications systems 502, 504, 506, and 508 in a number of different ways. In one illustrative example, a data packet received at communications device 516 from communications device 548 may be sent to front-end router 518. Front-end router 518 may determine that the data packet is targeted for a host connected to front-end router 570.

Consequently, front-end router 518 sends the data packet to switch 540, which in turn, sends the data packet to front-end router 526. Front-end router 526 then sends the data packet to communications device 524, which in turn, sends the data packet to communications device 568. Communications device 568 may then send the data packet to front-end router 570. Front-end router 570 forwards the data packet to the correct host.

The flow of information between the different radio communications systems in the different communications networks described in FIGS. 3-5 and the configurations for the different radio communications systems in FIGS. 3-5 are only examples of some types of information flow and possible configurations. Other types of flows may be used and other configurations may be implemented in other illustrative examples.

The illustrations of communications network 300 in FIGS. 3-4 and communications network 500 in FIG. 5 are not meant to imply physical or architectural limitations to the manner in which an illustrative embodiment may be implemented. Other components in addition to or in place of the ones illustrated may be used. Some components may be optional.

Further, the different components illustrated in FIG. 1 and FIGS. 3-5 may be combined with components in FIG. 2, used with components in FIG. 2, or a combination of the two. Additionally, some of the components in FIG. 1 and FIGS. 3-5 may be illustrative examples of how components shown in block form in FIG. 2 may be implemented as physical components.

Figure 6:
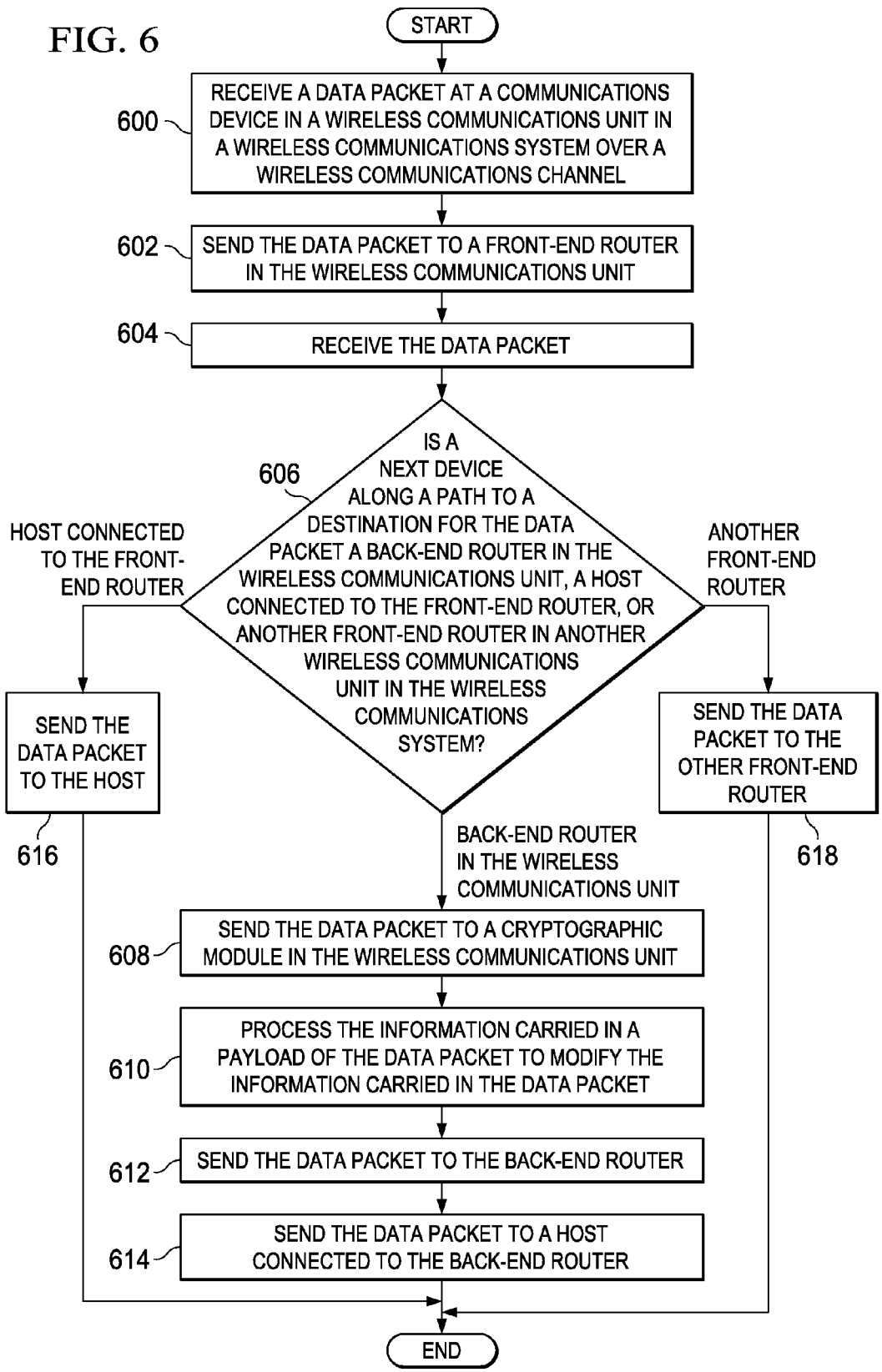
FIG. 6 is an illustration of a process for exchanging information, in the form of a flowchart, in accordance with an illustrative embodiment.

Turning now to FIG. 6, an illustration of a process for exchanging information, in the form of a flowchart, is depicted in accordance with an illustrative embodiment. The process illustrated in FIG. 6 may be implemented in a communications environment such as communications environment 200 in FIG. 2. For example, this process may be implemented to exchange information in a communications network such as communications network 201 in FIG. 2. The process illustrated in FIG. 6 may be implemented using, for example, wireless communications system 206 in FIG. 2.

The process begins by receiving a data packet at a communications device in a wireless communications unit in a wireless communications system over a wireless communications channel (operation 600). The process then sends the data packet to a front-end router in the wireless communications unit (operation 602).

The front-end router receives the data packet (operation 604). Thereafter, the front-end router determines whether a next device along a path to a destination for the data packet is a back-end router in the wireless communications unit, a host connected to the front-end router, or another front-end router in another wireless communications unit in the wireless communications system (operation 606). In operation 606, the process identifies the next device along the path to the destination for the data packet using a header of the data packet.

If the next device is a back-end router in the wireless communications unit, the front-end router sends the data packet to a cryptographic module in the wireless communications unit (operation 608). Thereafter, the cryptographic module processes the information carried in a payload of the data packet to modify the information carried in the data packet (operation 610). In one illustrative example, when the information carried in the payload of the data packet is encrypted, the cryptographic module decrypts the information to form an unencrypted data packet.

The cryptographic module then sends the data packet to the back-end router (operation 612). The back-end router sends the data packet to a host connected to the back-end router (operation 614), with the process terminating thereafter.

With reference again to operation 606, if the next device is a host connected to the front-end router, the front-end router sends the data packet to the host (operation 616), with the process terminating thereafter. The host connected to the front-end router may have a lower security clearance than the host connected to the back-end router.

With reference again to operation 606, if the next device is another front-end router in another wireless communications unit in the wireless communications system, the front-end router sends the data packet to the other front-end router (operation 618), with the process terminating thereafter. This other front-end router may then forward the data packet to a next device accordingly.

With reference now to FIG. 7, an illustration of a process for exchanging information, in the form of a flowchart, is depicted in accordance with an illustrative embodiment. The process illustrated in FIG. 6 may be implemented in a communications environment such as communications environment 200 in FIG. 2. For example, this process may be implemented to exchange information in a communications network such as communications network 201 in FIG. 2. The process illustrated in FIG. 6 may be implemented using, for example, wireless communications system 206 in FIG. 2.

The process begins by receiving a data packet at a back-end router in a wireless communications unit in the wireless communications system (operation 700). The back-end router sends the data packet to a cryptographic module in the wireless communications unit (operation 702).

The cryptographic module processes information in the data packet to modify the information in the data packet (operation 704). In particular, in operation 704 when the information carried in a payload of the data packet is unencrypted, the cryptographic module encrypts the information in the payload of the data packet to form an encrypted data packet.

The cryptographic module then sends the data packet to the front-end router (operation 706). The front-end router determines whether a next device along a path to the destination for the data packet is another front-end router in another wireless communications unit in the wireless communications system connected to the front-end router or another front-end router in another wireless communications unit in another wireless communications system (operation 708).

If the next device is another front-end router in another wireless communications unit in the wireless communications system connected to the front-end router, the front-end router sends the data packet to this other front-end router (operation 710), with the process terminating thereafter.

Otherwise, if the next device is another front-end router in another wireless communications unit in another wireless communications system, the front-end router sends the data packet to this other front-end router through a communications device in the wireless communications unit (operation 712), with the process terminating thereafter. In particular, in operation 712, the communications device sends the data packet to the other front-end router over a wireless communications channel.

The flowcharts, information flows, and block diagrams in the different depicted embodiments illustrate the architecture, functionality, and operation of some possible implementations of apparatus and methods in an illustrative embodiment. In this regard, each block in the flowcharts, information flows, or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus for exchanging information in a communications environment. In one illustrative embodiment, a wireless communications system comprises a wireless communications unit. The wireless communications unit comprises a communications device, a back-end router, a cryptographic module connected to the back-end router, and a front-end router connected to the cryptographic module and the communications device. The communications device is configured to exchange information over a single wireless communications channel. The front-end router is configured to perform at least one of sending a first data packet received at the front-end router from the communications device to the back-end router through the cryptographic module and sending a second data packet received at the front-end router from the back-end router through the cryptographic module to the communications device.

In the different illustrative examples, the wireless communications system is scalable with any number of wireless communications units. The wireless communications units are configured to be modular in these illustrative examples. Further, these wireless communications units may be connected to each other in the wireless communications system with a lower level of complexity as compared to a communications system in which all of the components are located in a single wireless communications unit.

Further, a wireless communications system in these illustrative examples may be reconfigured while in use or in the field. In this manner, the wireless communications system may be an ad-hoc wireless communications system. For example, one or more wireless communications units may be added, removed, or replaced depending on the desired configuration. Removing one wireless communications unit does not affect the other wireless communications units in a wireless communications system.

The description of the different illustrative embodiments has been presented for purposes of illustration and description, and is not intended to be exhaustive or limited to the embodiments in the form disclosed. Many modifications and variations will be apparent to those of ordinary skill in the art.

For example, although the illustrative embodiments have been described mainly with respect to radio communications systems, the different illustrative embodiments may be applied to other types of communication systems. For example, a wireless communications system may employ wireless communications units that establish different types of wireless communications channels, such as optical communications channels.

Further, different illustrative embodiments may provide different features as compared to other desirable embodiments. The embodiment or embodiments selected are chosen and described in order to best explain the principles of the embodiments, the practical application of the embodiments, and to enable others of ordinary skill in the art to understand the disclosure for various embodiments with various modifications as are suited to the particular use contemplated.

What is claimed is:

1. A wireless communications system comprising:
a first wireless communications unit in a number of wireless communications units in the wireless communications system, wherein the first wireless communications unit comprises:
a communications device configured to exchange information over a single wireless communications channel using a communications protocol;
a back-end router;
a cryptographic module connected to the back-end router; and
a first front-end router connected to the cryptographic module and the communications device, wherein the first front-end router is configured to perform at least one of sending a first data packet received at the first front-end router from the communications device to the back-end router through the cryptographic module and sending a second data packet received at the first front-end router from the back-end router through the cryptographic module to the communications device, wherein the cryptographic module is configured to receive an unencrypted data packet from the back-end router, encrypt the information carried in the unencrypted data packet to form an encrypted data packet, and send the encrypted data packet to the first front-end router as the second data packet, and wherein the first front-end router is also configured to send the encrypted data packet to a second front-end router along a path to a destination for the second data packet, wherein the second front-end router is in a second wireless communications unit in the number of wireless communications units in the wireless communications system; and
a switch connected to the first front-end router in the first wireless communications unit and the second front-end router in the second wireless communications unit, wherein the first front-end router is configured to send the second data packet to the second front-end router through the switch.

2. The wireless communications system of claim 1, wherein the encrypted data packet is a first encrypted data packet, the unencrypted data packet is a first unencrypted data packet, and wherein the cryptographic module is also configured to receive a third data packet from the first front-end router as a second encrypted data packet, decrypt the information carried in the second encrypted data packet to form a second unencrypted data packet, and send the second unencrypted data packet to the back-end router.

3. The wireless communications system of claim 2, wherein the back-end router is configured to send the second unencrypted data packet to a next device along a path to a destination for the third data packet.

4. The wireless communications system of claim 3, wherein the next device is a host connected to the back-end router.

5. The wireless communications system of claim 1, wherein the first front-end router is configured to send the second data packet to the second front-end router through the communications device over the single wireless communications channel.

6. The wireless communications system of claim 1, wherein the first front-end router is configured to send the second data packet to the second front-end router using a wired connection between the first front-end router and the second front-end router.

7. The wireless communications system of claim 1, wherein the first front-end router is connected to a first host authorized to have access to the information belonging to a first security category and wherein the back-end router is connected to a second host authorized to have access to the information belonging to a second security category.

8. The wireless communications system of claim 1, wherein the communications device in the first wireless communications unit is configured to exchange the information over the single wireless communications channel using a radio frequency signal.

9. The wireless communications system of claim 1, wherein the communications device is a first communications device, the single wireless communications channel is a first wireless communications channel, the back-end router is a first back-end router, and the cryptographic module is a first cryptographic module, and
- wherein the second wireless communications unit comprises:
- a second communications device configured to exchange the information over a second wireless communications channel using another communications protocol;
- a second back-end router;
- a second cryptographic module connected to the second back-end router; and
- the second front-end router connected to the second cryptographic module, the second communications device, and the first front-end router in the first wireless communications unit.

10. A communications network comprising:
- a number of sub-networks in which a sub-network in the number of sub-networks comprises a group of radio communications systems in which a radio communications system in the group of radio communications systems comprises a number of radio communications units and in which a first radio communications unit in the number of radio communications units comprises:
  - a communications device configured to use a communications protocol to exchange information over a single wireless communications channel using a radio frequency signal;
  - a back-end router;
  - a cryptographic module connected to the back-end router; and
  - a first front-end router connected to the cryptographic module and the communications device, wherein the first front-end router is configured to perform at least one of sending a first data packet received at the first front-end router from the communications device to the back-end router through the cryptographic module and sending a second data packet received at the first front-end router from the back-end router through the cryptographic module to the communications device, wherein the cryptographic module is configured to receive an unencrypted data packet from the back-end router, encrypt the information carried in the unencrypted data packet to form an encrypted data packet, and send the encrypted data packet to the first front-end router as the second data packet, and wherein the first front-end router is also configured to send the encrypted data packet to a second front-end router along a path to a destination for the second data packet, wherein the second front-end router is in a second radio communications unit in the number of radio communications units in the radio communications system; and
- a switch connected to the first front-end router in the first radio communications unit and the second front-end router in the second radio communications unit, wherein the first front-end router is configured to send the second data packet to the second front-end router through the switch.

11. The communications network of claim 10, wherein the first front-end router is connected to a first host authorized to have access to the information belonging to a first security category and wherein the back-end router is connected to a second host authorized to have access to the information belonging to a second security category.

* * * * *